(12) United States Patent
Coffey et al.

(10) Patent No.: US 9,260,636 B2
(45) Date of Patent: Feb. 16, 2016

(54) ADHESIVE COMPOSITIONS AND METHODS

(75) Inventors: James Norris Coffey, League City, TX (US); Lynette Eileen Horne-Campbell, Friendswood, TX (US); Fran A Shipley, Eagle Nest, NM (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 39 days.

(21) Appl. No.: 13/581,956

(22) PCT Filed: Mar. 4, 2011

(86) PCT No.: PCT/US2011/027231
§ 371 (c)(1), (2), (4) Date: Dec. 7, 2012

(87) PCT Pub. No.: WO2011/129926
PCT Pub. Date: Oct. 20, 2011

(65) Prior Publication Data
US 2013/0109801 A1    May 2, 2013

Related U.S. Application Data

(60) Provisional application No. 61/323,455, filed on Apr. 13, 2010.

(51) Int. Cl.
| C09J 133/08 | (2006.01) |
| C09J 153/02 | (2006.01) |
| C08L 23/08 | (2006.01) |
| C08L 53/02 | (2006.01) |
| C09J 123/08 | (2006.01) |
| C08L 93/00 | (2006.01) |
| C08L 91/06 | (2006.01) |

(52) U.S. Cl.
CPC .......... *C09J 133/08* (2013.01); *C08L 23/0853* (2013.01); *C08L 23/0869* (2013.01); *C08L 53/02* (2013.01); *C09J 123/0853* (2013.01); *C09J 123/0869* (2013.01); *C09J 153/02* (2013.01); *C08L 91/06* (2013.01); *C08L 93/00* (2013.01); *C08L 2205/02* (2013.01)

(58) Field of Classification Search
CPC ....... C09J 133/08; C09J 153/02; C08L 23/08; C08L 53/02
USPC .......................................... 524/524; 525/229
See application file for complete search history.

(56) References Cited

U.S. PATENT DOCUMENTS

| 4,209,437 | A | * | 6/1980 | Fischer .......................... 524/297 |
| 4,424,642 | A | * | 1/1984 | Stubler et al. .................... 43/114 |
| 4,975,481 | A | | 12/1990 | Tamm et al. |
| 5,670,566 | A | | 9/1997 | Liedermooy et al. |
| 5,741,840 | A | | 4/1998 | Lindquist et al. |
| 6,117,945 | A | | 9/2000 | Mehaffy et al. |
| 6,593,407 | B2 | | 7/2003 | Haner et al. |
| 7,166,662 | B2 | | 1/2007 | Haner et al. |
| 2003/0212202 | A1 | * | 11/2003 | Haner et al. ................... 525/54.4 |
| 2004/0198897 | A1 | | 10/2004 | Domine et al. |
| 2004/0204529 | A1 | | 10/2004 | Gipson |
| 2006/0068672 | A1 | | 3/2006 | Quinn |
| 2006/0122302 | A1 | * | 6/2006 | Pazur et al. .................... 524/430 |
| 2008/0249216 | A1 | | 10/2008 | Gong et al. |
| 2008/0249233 | A1 | * | 10/2008 | Haner et al. ................... 524/529 |

FOREIGN PATENT DOCUMENTS

| EP | 1 926 792 | 6/2008 |
| WO | 02/060993 | 8/2002 |
| WO | 2006/041736 | 4/2006 |
| WO | 2007/002177 | 1/2007 |
| WO | WO 2011129926 A1 * | 10/2011 |

OTHER PUBLICATIONS

Matweb.com—Exxon Mobil Escorene® LD 721.IK.*
Matweb.com—Exxon Mobil Enable® EN333330 Adhesive Resin.*
Matweb.com—EVA—Adhesive/Sealant Overview.*
DuPont Elvax® 410 Data Sheet—http://www2.dupont.com/Elvax/en_US/aasets/downloads/vax410.pdf—Published Jan. 25, 2007.*
Reding et al., "Glass Transition and Melting Point of Poly(vinyl Chloride)", J. Polym. Sci., vol. 56, pp. 225-231, (1962).*
Rao et al., "Processing characteristics of blends of polyvinyl chloride and polystyrene", J. Mat. Sci. Lett., vol. 13, pp. 1622-1624, (1994).*

* cited by examiner

*Primary Examiner* — Ling Choi
*Assistant Examiner* — Ronald Grinsted
(74) *Attorney, Agent, or Firm* — Priya G. Prasad; Chad A. Guice

(57) ABSTRACT

Compositions are disclosed comprising (i) a high molecular weight base polymer, and (ii) a relatively low molecular weight ester copolymer comprising an olefin and a copolymerizable ester, wherein the ester copolymer has a pour point less than 40° C. In certain embodiments, the high molecular weight base polymer and the relatively low molecular weight ester copolymer are both selected from ethylene-based copolymers such as ethylene-vinyl acetate and ethylene-n-butyl acrylate.

24 Claims, 4 Drawing Sheets

ADHESIVE COMPOSITIONS AND METHODS

PRIORITY CLAIM

This application is a National Stage filing of International Patent Cooperation Treaty Application No. PCT/US2011/027231 filed Mar. 4, 2011 which claims priority to U.S. Provisional Application Ser. No. 61/323,455, filed Apr. 13, 2010, both of which are fully incorporated herein by reference in their entirety.

BACKGROUND

This invention relates to adhesive compositions and methods wherein the viscosity of the adhesive in a hot melt is reduced so that it can be applied with less energy and better wet out the surface of the substrate.

A hot melt adhesive (HMA) is a thermoplastic polymer system applied in a molten state. The molten adhesives are applied to a substrate and then placed in contact with another substrate. The adhesive cools and solidifies to form a bond between the substrates. Hot melt adhesives are widely used in the packaging industry, for example, to seal and close cartons or to laminate multilayer papers.

A wide variety of thermoplastic base polymers, particularly ethylene-based polymers such as ethylene-unsaturated ester copolymers, including ethylene-vinyl acetate (EVA) and ethylene-n-butyl acrylate (EnBA), have traditionally been used in HMA, but often the adhesive formulation requires substantial use of low molecular weight ingredients such as wax and tackifier to adjust the viscosity and glass transition temperature to useful ranges. Thus, ethylene-unsaturated ester copolymer formulations are typically exemplified by a wax with either a low molecular weight or a low crystallization temperature.

The base polymer selection has largely influenced the flow and mechanical properties: (a) viscosity and rheology characteristics; (b) cohesive strength; (c) flexibility; and (d) adhesive strength. The viscosity of the copolymer has typically been a few orders of magnitude higher than the viscosity of the wax. Low viscosity wax has been used to reduce the high viscosity of the copolymer and resin to ensure efficient mixing. This viscosity reduction is particularly important during the mixing and application stages. In the mixing stage, low viscosity is advantageous because it reduces the energy required to mix the adhesive. In the application stage, a low viscosity HMA is required to pump the molten adhesive from the storage tank to the application area and to ensure proper sprayability and/or surface wetting when applied.

The HMA attributes required for good bonding strength, cohesive strength and low viscosity generally conflict with each other. Generally selecting optimum performance is a matter of trading off one property against another, for example, reducing viscosity decreases adhesion and/or cohesive strength. It is challenging to obtain the desired balance between bonding strength and low viscosity.

The adhesion industry continues to search for adhesive compositions having a balance of properties. Accordingly, there exists a current and long felt need for adhesive compositions that overcome known deficiencies in conventional compositions and have advantageous processing properties.

SUMMARY

In one aspect, the present invention resides in a composition comprising a base polymer, and an ester copolymer comprising an olefin and a copolymerizable ester, wherein the ester copolymer has a pour point less than 40° C. In an embodiment, the viscosity at 177° C. of the composition is less than 95% of the viscosity without incorporating the ester copolymer.

Some embodiments of this invention provide an adhesive composition which exhibits a good balance of bonding strength and low viscosity. Good balance is achieved by an adhesive composition comprising a high molecular weight base polymer and a relatively low molecular weight ethylene-vinyl ester copolymer that has a low pour point. In one embodiment, the low-pour point ester copolymer is a liquid grade ethylene-vinyl ester copolymer.

The low pour point ester copolymer has an effect in lowering the melt viscosity when present in a composition in a relatively minor proportion with an adhesive grade ethylene-vinyl ester copolymer; and, in some embodiments, without much change in adhesive strength measured as fiber tear at 25° C.

In an embodiment, the composition further comprises a tackifier and a wax. In an embodiment, the composition comprises from 1 wt % to 80 wt % of the base polymer, from 1 wt % to 65 wt % of the tackifier, and from 1 wt % to 15 wt % of the wax, based on the total weight of the base polymer, the tackifier, and the wax. In an embodiment, the viscosity at 177° C. of the composition is less than 95% of the viscosity of a blend of the base polymer, the tackifier, and the wax. In an embodiment, the fiber tear of the composition at 25° C. using Inland paper board as a substrate is at least 95% of the fiber tear of the blend. In an embodiment, the composition has at least 95% fiber tear at 25° C. using Inland paper board as a substrate.

In an embodiment, the ester copolymer is present at from 1% to 25% by weight of the base polymer. In an embodiment, the olefin comprises ethylene. In an embodiment, the copolymerizable ester is selected from the group consisting of vinyl esters of carboxylic acids, alkyl esters of acrylic and methacrylic acids, and combinations thereof. In an embodiment, the base polymer comprises a melt index from 10 to 1000 g/10 minutes. In an embodiment, the base polymer is selected from ethylene-vinyl acetate and ethylene-n-butyl acrylate, and in a further embodiment, the ester copolymer comprises ethylene-vinyl acetate.

In an embodiment, the ester copolymer comprises a pour point below 25° C. In an embodiment, the ester copolymer comprises a viscosity at 25° C. from 50 to 300 mPa-s. In an embodiment, the ester copolymer is at least 95% by weight non-crystalline. In an embodiment, a crystallization temperature of the neat base polymer is within 2° C. of a crystallization temperature of the base polymer in the composition, or stated differently, the composition has a crystallization temperature within 2° C. of the neat base polymer.

In an embodiment, the base polymer comprises from 15% to 45% by weight of a copolymerizable ester. In an embodiment, the ester copolymer comprises from 10% to 60% by weight of a copolymerizable ester.

In an embodiment, the composition further comprises an antioxidant, colorizer, dye, or filler.

In one embodiment, an adhesive composition comprises: from 1 wt % to 80 wt % of a base polymer selected from ethylene-vinyl acetate and ethylene-n-butyl acrylate, from 1 wt % to 60 wt % of a tackifier, and from 1 wt % to 15 wt % of a wax, by total weight of the base polymer, the tackifier, and the wax; and from 1 wt % to 25 wt % of a liquid ethylene-vinyl acetate copolymer by weight of the base polymer; wherein the base polymer is solid at 25° C. and has a melt index greater than 10 g/10 minutes; wherein the viscosity at 177° C. of the adhesive composition is less than 80% of the viscosity of a blend of the base polymer, tackifier, and wax; and wherein the adhesive composition has at least 95% fiber tear at 25° C. using Inland paper board as a substrate.

In one embodiment, a method of reducing the melt viscosity of a hot melt adhesive, comprising a mixture of an adhesive copolymer of ethylene, and a copolymerizable ester, a tackifier, and a wax, comprises the step of incorporating a liquid ethylene-copolymerizable ester copolymer into the mixture in an amount from 1 wt % to 25 wt % by weight of the adhesive copolymer. In an embodiment, incorporation of the liquid copolymer reduces the viscosity of the hot melt adhesive at 177° C. by at least 20% relative to the hot melt adhesive without the liquid copolymer, and wherein the hot melt adhesive incorporating the liquid copolymer has a fiber tear of at least 95% at 25° C. using Inland paper board as a substrate. In an embodiment, the method further comprises applying the hot melt adhesive to a substrate at a temperature of less than 150° C.

DETAILED DESCRIPTION OF PREFERRED EMBODIMENTS

Figure 1:
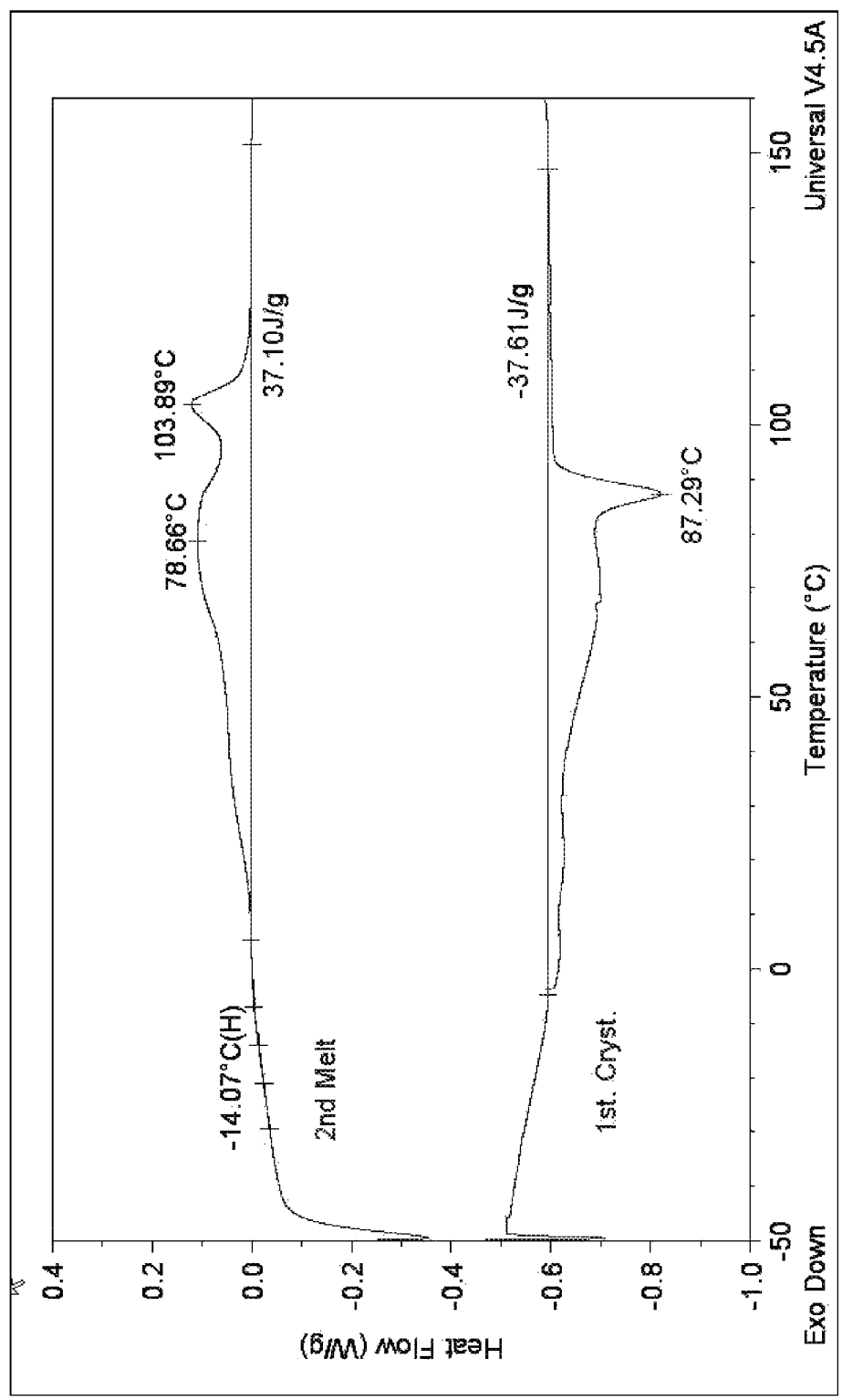
FIG. 1 shows differential scanning calorimetry (DSC) curves for a commercial ethylene-n-butyl acrylate (EnBA) resin, EXXONMOBIL EnBA EN 33330, in a hot melt adhesive (HMA) composition without any added liquid ethylene-vinyl acetate (EVA) copolymer as described in example HMA1 in Table 1.

The term "polymer" as used herein refers to high molecular weight molecules comprising repeating units, generally having a weight average molecular weight of at least about 500 g/mol. As used herein molecular weight refers to the weight average molecular weight in g/mol, unless otherwise specified. When two or more adhesive polymer components are used, the weight average molecular weight, viscosity, and crystallization temperature of the adhesive polymer, used herein, refers to the weight average molecular weight, viscosity, and crystallization temperature of the blend of all adhesive polymer components used in the adhesive or hot melt adhesive (HMA) mixture.

In one embodiment, a composition comprises a base polymer, and an ester copolymer comprising an olefin and copolymerizable ester having a pour point less than 40° C. wherein the base polymer is different than the ester copolymer. In another embodiment, the base polymer has a peak melting point greater than 50° C. In still another embodiment, the melt index of the base polymer is from 0.1 g/10 minutes to 3,000 g/10 min, from 0.1 g/10 minutes to 2,000 g/10 minutes, from 0.1 g/10 minutes to 1,500, from 0.1 g/10 minutes to 1,000, from 0.1 g/10 minutes to 500 g/10 minutes. As used herein, melt index is determined at 190° C./2.16 kg in accordance with ASTM D1238. In a further embodiment, the base polymer is solid at 50° C. "Solid" shall mean of definite shape and volume and not pourable under ASTM D97.

In one embodiment, the base polymer may be selected from styrenic block copolymers; polypropylene-based polymers such as polypropylene-ethylene copolymers and polypropylene-butene copolymers, propylene-hexene copolymers and propylene-octene copolymers; and polyethylene-based polymers such as ethylene-propylene copolymers, ethylene-octene copolymers, and ethylene vinyl acetate copolymers.

In another embodiment, a composition comprises a base polymer comprising a first olefin and a first copolymerizable ester having a peak melting point greater than 50° C., and a ester copolymer comprising a second olefin and a second copolymerizable ester having a pour point less than 40° C.

For purposes of this disclosure, when a polymer or oligomer is referred to as comprising an olefin, the olefin present in the polymer or oligomer is the polymerized or oligomerized form of the olefin, respectively. Likewise, the use of the term "polymer" is meant to encompass homopolymers and copolymers. The term "copolymer" is used herein to include any polymer having two or more monomers. That is, in the case of a propylene copolymer, at least one other comonomer is polymerized with the propylene to make the copolymer.

In one embodiment, the olefins are selected from ethylene, propylene, butylenes, and so on. In one embodiment, the first and/or second olefins comprise ethylene, e.g., the first and ester copolymers comprise ethylene copolymers. In one embodiment, the first and/or ester copolymers comprise one or more polar monomers, such as vinyl acetate or other vinyl esters of monocarboxylic acids or acrylic or methacrylic acid or their esters with methanol, ethanol, or other alcohols. Specific representative copolymers can include ethylene vinyl acetate, ethylene methyl acrylate, ethylene n-butyl acrylate, ethylene acrylic acid, ethylene 2-ethylhexyl acrylate, ethylene methacrylate, and mixtures and blends thereof. Ethylene n-butyl acrylate and ethylene vinyl acetate, as well as mixtures thereof, are particularly preferred. Random and block copolymers, as well as mixtures thereof, may be used in an embodiment.

The base polymer, in various embodiments, has a peak melting point greater than 50° C., greater than 60° C., greater than 70° C., greater than 80° C., greater than 90° C., greater than 95° C., greater than 100° C., or greater than 105° C. In an additional or alternative embodiment, the base polymer can have a melt index from about 10 to about 1000 g/10 minutes. As used herein, melt index is determined at 190° C./2.16 kg in accordance with ASTM D1238. In an additional or alternative embodiment, the base polymer can have a melt viscosity at 190° C. of at least 1000 mPa-s, preferably at least 2000 mPa-s. As used herein, viscosity (i.e., melt viscosity) is determined at 190° C. in accordance with ASTM D3236, unless otherwise indicated.

In an embodiment, the base polymer can have a copolymerizable ester comonomer content from about 5% to about 50% by weight of the base polymer, preferably from about 10% to about 40% by weight of the base polymer. In one embodiment, the base polymer is an ethylene-vinyl acetate copolymer (EVA) having a vinyl acetate (VA) content from 10 to 40% by weight of the base polymer; and in another embodiment, an ethylene-n-butyl acrylate copolymer (EnBA) having an n-butyl acrylate (nBA) content from 25% to 40% by weight of the base polymer.

EVA resins are commercially available under the trade designation ESCORENE, e.g., ESCORENE ULTRA MV 02514 EVA (14 wt % vinyl acetate). EnBA resins are commercially available under the trade designations EN, e.g., EXXONMOBIL EnBA EN 33330 EnBA (33 wt % EnBA, MI 330) and EXXONMOBIL EnBA EN 33900 EnBA (33 wt % EnBA, MI 900).

In an embodiment, the ester copolymer has a pour point less than 40° C., less than 35° C., less than 30° C., less than 25° C., less than 20° C., less than 15° C., or less than 10° C. As used herein, pour point is determined in accordance with ASTM D97. A liquid copolymer is defined herein as one having a pour point of 25° C. or below. In an embodiment, the ester copolymer can have a copolymerizable ester comonomer content from about 5% to about 65% by weight of the ester copolymer, preferably from about 10% to about 60% by weight of the ester copolymer, more preferably from about 20% to about 55% by weight of the ester copolymer, more preferably from about 30% to about 45% by weight of the ester copolymer. In one embodiment, the ester copolymer comprises a liquid EVA, and in a further embodiment a liquid EVA having a vinyl acetate content from 35% to 40% by weight of the liquid EVA.

In an embodiment, the adhesive comprises a copolymer comprising more than 50% ethylene vinyl acetate wherein the ethylene vinyl acetate has a vinyl acetate content of greater than 10% and wherein the adhesive composition has a viscosity of less than 3,000 MPa-s at 177° C. In one embodiment, the viscosity of the adhesive composition is less than 2,500, less than 2,000, and less than 1,500 MPa-s at 177° C. In one embodiment, the ethylene vinyl acetate has a vinyl acetate content of greater than 15%, greater than 20%, greater than 25%, greater than 30%.

In an embodiment, an adhesive composition comprises, in addition to the first and ester copolymers, a tackifier, and a wax. When the tackifier and/or wax are present, the adhesive composition, in one embodiment, comprises from 1 wt % to 80 wt % of the base polymer, from 1 wt % to 70 wt % of the tackifier, and from 1 wt % to 80 wt % of the wax, based on the total weight of the composition. In one embodiment, the adhesive composition comprises from 25 to 50 wt % of the tackifier, from 5 to 15 wt % of the wax, and from 10 to 60% of the base polymer base on the total weight of the composition.

In an embodiment, the composition comprises from 1 to 50 wt %, from 1 to 40 wt %, from 1 to 30 wt %, from 1 to 20 wt %, and from 1 to 10 wt % of the ester copolymer based on the total weight of the composition. In one embodiment, the composition comprises from 5 to 50 wt %, from 5 to 40 wt %, from 5 to 30 wt %, from 5 to 25 wt %, from 5 to 15 wt %, and from 7.5 to 15 wt % of the ester copolymer based on the total weight of the composition.

In general, the adhesive composition depends on the end use and application requirements; for instance, an exemplary hot melt packaging application formulation can contain 30 wt % EVA resin such as ESCORENE UL-7710, 45 wt % tackifier such as ESCOREZ 2394, and 25 wt % wax; an exemplary curtain coating formulation can contain 15 wt % EVA resin such as ESCORENE UL-7760, 7 wt % tackifier such as ESCOREZ 2203LC, and 78 wt % wax; an exemplary bookbinding formulation can contain 45 wt % EVA resin such as ESCORENE UL-7760 or 5637, 45 wt % tackifier such as ESCOREZ 2394 or 5637, and 10 wt % wax; and an exemplary glue stick formulation can contain 70 wt % EVA resin such as ESCORENE UL-7510, 30 wt % tackifier such as ESCOREZ 5300, and no wax. A liquid EVA can be added to each of the exemplary formulations to reduce melt viscosity, according to embodiments.

Examples of suitable tackifiers, include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes, modified terpenes, hydrogenated rosin acids, and hydrogenated rosin esters. In some embodiments, the tackifier is hydrogenated.

In some embodiments, the tackifier has a softening point (Ring and Ball, as measured by ASTM E-28) of 80° C. to 150° C., preferably 100° C. to 130° C. In another embodiment, the resin is liquid and has a ring and ball softening point of between 10° C. and 70° C.

The tackifier, if present, is typically present at about 1 wt % to about 70 wt %, such as about 20 wt % to about 65 wt %, for example about 30 wt % to about 50 wt %, based upon the weight of the base polymer, tackifier, and any wax.

Preferred hydrocarbon resins for use as tackifiers or modifiers include:

(a) Resins such as $C_5/C_6$ terpene resins, styrene terpenes, alpha-methyl styrene terpene resins, $C_9$ terpene resins, aromatic modified $C_5/C_6$, aromatic modified cyclic resins, aromatic modified dicyclopentadiene based resins or mixtures thereof. Additional preferred resins include those described in WO 91/07472; U.S. Pat. No. 5,571,867; U.S. Pat. No. 5,171,793; and U.S. Pat. No. 4,078,132. Typically, these resins are obtained from the cationic polymerization of compositions containing one or more of the following monomers: $C_5$ diolefins (such as 1,3-pentadiene, isoprene, etc); $C_5$ olefins (such as 2-methylbutenes, cyclopentene, etc.); $C_6$ olefins (such as hexene), $C_9$ vinylaromatics (such as styrene, alpha methyl styrene, vinyltoluene, indene, methyl indene, etc.); cyclics (such as dicyclopentadiene, methyldicyclopentadiene, etc.); and/or terpenes (such as limonene, carene, etc.); and (b) Resins obtained by the thermal polymerization of dicyclopentadiene, and/or the thermal polymerization of dimers or oligomers of cyclopentadiene and/or methylcyclopentadiene, optionally, with vinylaromatics (such as styrene, alpha-methyl styrene, vinyl toluene, indene, methyl indene).

Suitable commercially available tackifiers include ESCOREZ® 1000, 2000 and 5000 series hydrocarbon resins, and ECR-373, available from ExxonMobil Chemical Company; ARKON™ M series, ARKON P series and SUPER ESTER™ rosin esters available from Arakawa Chemical Company of Japan; SYLVARES™ phenol modified styrene-α methyl styrene resins, styrenated terpene resins, ZONATAC terpene-aromatic resins, and terpene phenolic resins available from Arizona Chemical Company of Jacksonville, Fla.; SYLVATAC™ and SYLVALITE™ rosin esters available from Arizona Chemical Company; NORSOLENE™ aliphatic aromatic resins available from Cray Valley of France; DERTOPHENE™ terpene phenolic resins available from DRT Chemical Company of Landes, France; EASTOTAC™ resins, PICCOTAC™ $C_5/C_9$ resins, REGALITE™ and REGALREZ™ aromatic and REGALITE™ cycloaliphatic/aromatic resins available from Eastman Chemical Company of Kingsport, Tenn.; WINGTACK™ resins available from Goodyear Chemical Company of Akron, Ohio; FORAL™ PENTALYN™, and PERMALYN™ rosins and rosin esters available from Eastman Chemical Company; QUINTONE™ acid modified $C_5$ resins, $C_5/C_9$ resins, and acid modified $C_5/C_9$ resins available from Nippon Zeon of Japan; LX™ mixed aromatic/cycloaliphatic resins available from Neville Chemical Company of Pittsburgh, Pa.; and CLEARON hydrogenated terpene aromatic resins available from Yasuhara Chemical of Japan. The preceding examples are illustrative only and by no means limiting.

Nonlimiting examples of waxes include petroleum based and synthetic waxes. Waxes suitable for use in the present invention include paraffin waxes, microcrystalline waxes, polyethylene waxes, polypropylene waxes, by-product polyethylene waxes, Fischer-Tropsch waxes, oxidized Fischer-Tropsch waxes, and functionalized waxes such as hydroxy stearamide waxes and fatty amide waxes and combinations of thereof. It is common in the art to use the terminology synthetic high melting point waxes to include high density low molecular weight polyethylene waxes, by-product polyethylene waxes, and Fischer-Tropsch waxes, which are useful herein.

The wax, if present, is typically present at about 1 wt % to about 80 wt %, about 1 wt % to 30 wt %, or about 1 wt % to 15 wt %, such as about 3 wt % to about 15 wt %, for example about 6 wt % to about 12 wt %, based upon the weight of the base polymer, tackifier, and wax.

Modified waxes, such as vinyl acetate modified, maleic anhydride modified, oxidized waxes, and other polar waxes may also be used in an embodiment. In an embodiment, the adhesive is essentially free of modified waxes, i.e., it is free of deliberately added modified waxes or contains less than 1 wt % of modified waxes. In an embodiment, the wax component comprises less than 2 wt % or less than 1 wt % modified waxes by weight of the total wax components.

Preferably, the wax components are paraffin waxes, microcrystalline waxes, Fischer-Tropsch synthetic waxes, and polyethylene waxes, all of which are a blend of linear and branched hydrocarbons. Paraffin waxes are complex mixtures of many substances. They mainly consist of saturated hydrocarbons.

Microcrystalline waxes are a type of wax produced by dewaxing petrolatum, as part of the petroleum refining process. Microcrystalline wax contains a higher percentage of isoparaffinic (branched) hydrocarbons and naphthenic hydrocarbons as compared with paraffin wax. It is characterized by the fineness of its crystals in contrast to the larger crystal of paraffin wax. It consists of high molecular weight saturated aliphatic hydrocarbons and has a high melting point. Typical microcrystalline wax crystal structure is small and thin, making the wax crystals relatively more flexible than paraffin wax crystals.

Polyolefin waxes typically have a weight average molecular weight of from 500 to 20,000 g/mol and can be produced by thermal degradation of high molecular weight branched polyolefin polymers or by direct polymerization of olefins. In other embodiments, the polyolefin wax blend component(s) has a weight average molecular weight of from 1,000 to 20,000, from 2,000 to 20,000, from 3,000 to 20,000, from 4,000 to 20,000, from 5,000 to 20,000, from 6,000 to 20,000, from 7,000 to 20,000, from 8,000 to 20,000, from 9,000 to 20,000, and from 10,000 to 20,000. Suitable polymerization processes include, for example, high-pressure technologies, in which the olefins, generally ethylene, are reacted free-radically under high pressures and temperatures to form branched waxes, and also low-pressure or Ziegler processes, in which ethylene and/or higher 1-olefins are polymerized using organometallic catalysts. Polyethylene waxes, produced using metallocene catalyst, have a narrower molecular weight distribution, more uniform incorporation of comonomer, and lower melting points, in comparison to the Ziegler-Natta technology. In one embodiment, the high molecular weight second wax component comprises a metallocene polyethylene wax.

In an embodiment, the polyethylene wax has an Mw of from about 2,000 to about 20,000 g/mol, a molecular weight distribution Mw/Mn, which is also referred to as the polydispersity index, of from about 2 to 10, a viscosity at 190° C. of from 50 to 1000 mPa·s, a melting temperature range of from about 120° C. to 131° C. for a homopolymer and from about 100° C. to 126° C. for a copolymer, and a density of from 0.90 to 0.97 g/cm$^3$. Low molecular weight polyethylene waxes are commercially available under the trade designations LICOWAX and LICOCENE from Clariant; PETROLITE C-4040 and POLYWAX 1000, 2000, and 3000 from Baker Petrolite Corporation (Sugarland, Tex.); low molecular weight by-product polyethylene waxes under the trade designation MARCUS 100, 200 and 300, from Marcus Chemical Co., a Division of H.R.D. Corp. (Houston, Tex.); are also available commercially from Honeywell Corporation or Eastman Corporation.

Fischer-Tropsch waxes can be produced by Fischer-Tropsch synthesis including, e.g., a catalyzed chemical reaction in which a mixture of carbon monoxide and hydrogen synthesis gas is converted into liquid hydrocarbons of various lengths. Fischer-Tropsch waxes are commercially available, for example, under the trade designations PARAFLINT H-1, H-4, and H-8 from Sasol-SA/Moore & Munger (Shelton, Conn.), and BARECO PX-105, from Baker Petrolite Corporation (Sugarland, Tex.).

In some embodiments, the wax component has a mettler drop point of 110° C. or more, as determined by ASTM D3954, a congealing point of 110° C. or more, as determined by ASTM D938, or a melting temperature of 110° C. or more, as determined by ASTM D3418-03.

The polyolefin waxes present in an embodiment of the hot melt compositions of the invention preferably have a ring & ball softening point of between 90° C. and 160° C., and a viscosity at 170° C. of between 50 and 30,000 mPa·s.

In another embodiment, the inventive hot melt adhesives comprise at least one polypropylene wax. Polypropylene waxes include both homo-polypropylenes and propylene copolymers. Preferably, the polypropylene wax has a ring & ball softening point of between 80° C. and 165° C., a peak melting temperature of from 80° C. to 165° C. as determined by DSC according to ASTM D3814-03, a Brookfield viscosity, measured at a temperature of 170° C., of between 20 and 40,000 mPa·s.

In yet another aspect, the adhesive can include 15 wt % or less, or 10 wt % or less, or 5 wt % or less of one or more additives selected from plasticizers, oils, stabilizers, antioxidants, pigments, dyestuffs, antiblock additives, polymeric additives, defoamers, preservatives, thickeners, adhesion promoters, rheology modifiers, humectants, fillers, surfactants, processing aids, cross-linking agents, neutralizing agents, flame retardants, fluorescing agents, compatibilizers, antimicrobial agents, nucleating agents, and water.

Exemplary oils may include aliphatic naphthenic oils, white oils, and combinations thereof, for example. The phthalates may include di-iso-undecyl phthalate (DIUP), di-iso-nonylphthalate (DINP), dioctylphthalates (DOP), combinations thereof, or derivatives thereof. Exemplary polymeric additives include homo poly-alpha-olefins, copolymers of alpha-olefins, copolymers and terpolymers of diolefins, elastomers, polyesters, block copolymers including diblocks and triblocks, ester polymers, alkyl acrylate polymers, and acrylate polymers. Exemplary plasticizers may include mineral oils, polybutenes, phthalates, and combinations thereof.

Exemplary anti-oxidants include alkylated phenols, hindered phenols, and phenol derivatives, such as t-butyl hydroquinone, butylated hydroxyanisole, polybutylated bisphenol, butylated hydroxy toluene (BHT), alkylated hydroquinone, 2,6-di-tert-butyl-paracresol, 2,5-di-tert-aryl hydroquinone, octadecyl-3-(3,5-di-tert-butyl-4-hydroxy phenyl), tetrakis-(methylene-(3,5-di-(tert)-butyl-4-hydrocinnamate)) methane (IRGANOX 1010), etc. Examples of hindered phenolic antioxidants are commercially available under the IRGANOX series of trade designations including IRGANOX 565, IRGANOX 1010 and IRGANOX 1076 from Ciba Specialty Chemicals (Basel, Switzerland). In one embodiment, the adhesive composition comprises from 0.01 wt % to 3 wt % of an antioxidant, preferably from 0.05 wt % to 2 wt %.

Exemplary fillers include silica, diatomaceous earth, calcium carbonate, iron oxide, hydrogenated castor oil, fumed silica, precipitated calcium carbonate, hydrophobic treated fumed silicas, hydrophobic precipitated calcium carbonates, talc, zinc oxides, polyvinyl chloride powders, fungicides, graphite, carbon black, asphalt, carbon fillers, clay, mica, fibers, titanium dioxide, cadmium sulfide, asbestos, wood flour, polyethylene powder, chopped fibers, bubbles, beads, thixotropes, bentonite, calcium sulfate, calcium oxide, magnesium oxide, and combinations or derivates thereof. Exemplary surfactants include vinyl-containing or mercapto-containing polyorganosiloxanes, macromonomers with vinyl terminated polydimethyl siloxane, and combinations or derivatives thereof.

Exemplary adhesion promoters include silanes, titanates, organosilane, acrylics, acids, anhydrides, epoxy resins, hardening agents, polyamides, methylacrylates, epoxies, phenolic resins, polyisobutylene, aminoalkyl, mercaptoalkyl, epoxyalkyl, ureidoalkyl, carboxy, acrylate and isocyanurate functional silanes, mercaptopropyltrimethoxysilane, glycidoxypropyltrimethoxysilane, aminopropyltriethoxysilane, amino ethylaminopropyltrimethoxysilane, ureidopropyltrimethyloxysilane, bis-gamma-trimethoxysilyl-propylurea, 1,3,5-tris-gamma-trimethoxysilylpropylisocyanurate, bis-gamma-trimethoxysilylpropylmaleate, fumarate and gamma-methacryloxypropyltrimethoxysilane, aminopropyltriethoxysilane, and combinations and derivatives thereof. Exemplary crosslinking agents include oxime crosslinkers, alkoxysilanes, epoxyalkylalkoxysilanes, amido silanes, aminosilanes, enoxysilanes, tetraethoxysilanes, methyltrimethoxy silane, vinyl trimethoxysilane, glycidoxypropyltrimethoxsilane, vinyl tris-isopropenoxysilane, methyl tris-isopropenoxysilane, methyl tris-cyclohexylaminosilane, methyl tris-secondarybutylaminosilane, polyisocyanates, and combinations or derivatives thereof. Exemplary organic solvents include aliphatic solvents, cycloaliphatic solvents, mineral spirits, aromatic solvents, hexane, cyclohexane, benzene, toluene, xylene, and combinations or derivatives thereof.

Exemplary stabilizers include hindered phenols, sulfur phenols, phosphorous-containing phenols, 1,3,5-trimethyl-2,4,6-tris(3-5-di-tert-butyl-4-hydroxybenzyl)benzene, pentaerythritol tetrakis-3(3,5-di-tert-butyl-4-hydroxyphenyl) propionate, n-octadecyl-3 (3,5-di-tert-butyl-4-hydroxyphenyl) propionate, 4,4'-methylenebis(4-methyl-6-tert butylphenol), 4,4'-thiobis(6-tertbutyl-o-cresol), 2,6-di-tert-butylphenol, 6-(4-hydroxyphenoxy)-2,4-bis(n-ocytlthio)-1,3,5-triazine, 2,4,6-tris(4-hydroxy-3,5-di-tert-butyl-phenoxy)-1,3,5-triazine, di-n-octadecyl-3,5-di-tert-butyl-4-hydroxybenzylphosphonate, 2-(n-octylthio)ethyl-3,5-di-tert-butyl-4-hydroxybenzoate, sorbitol hexa-(3,3,5-di-tertbutyl-4-hydroxy-phenyl) propionate, and combinations or derivatives thereof. In one aspect, the adhesive composition includes from 0.01% to 3% by weight of the one or more stabilizers.

In one embodiment, the adhesives comprise a nucleating agent, preferably present at 50 to 4000 ppm based on total weight of the adhesive composition. Exemplary nucleating agents include: HYPERFORM (e.g., HPN-68 and MILLAD additives, e.g., MILLAD 3988) from Milliken Chemicals, Spartanburg, S.C. and organophosphates such as, for example, NA-11 and NA-21 from Amfine Chemicals, Allendale, N.J. In another embodiment, the wax is the only nucleating agent present in the adhesive blend.

Preferably, the peak melting temperature of the adhesive composition is 120° C. or less, preferably 110° C. or less. Low melting temperature allows the adhesives to be applied at low application temperature. In one embodiment, the adhesive is a low application temperature hot melt adhesive, i.e., an adhesive that can be applied to a substrate surface at a temperature of less than 150° C. (302° F.), less than 140° C. (284° F.), less than 130° C. (266° F.), less than 125° C. (257° F.), less than 120° C. (248° F.), or less than 115° C. (239° F.), and then used to bond the substrate to a second substrate surface. Such adhesives do not require heating to temperatures greater than these to sufficiently reduce viscosity for application.

Adhesive compositions, according to one embodiment, exhibit a novel and advantageous balance of properties including: at least 20% fiber tear at −18° C., and at least 50% fiber tear at 25° C. using Inland paper board as a substrate, a viscosity of less than 50,000 mPa-s at 190° C.

In an embodiment, the composition can be in the form of an adhesive mixture having a viscosity at 177° C. of from about 500 to about 2000 mPa-s, or from about 700 to about 1100 mPa-s. Unless a shear rate is specified, viscosity values given herein refer to the zero-shear viscosity, i.e., the viscosity at the limit of low shear rate, based upon extrapolation from measurements at 177° C. using a BROOKFIELD viscometer or similar instrument at low shear rates, e.g., within the range of about 0.01 to about 10 l/s.

In preferred embodiments, the adhesive compositions have a Shear Adhesion Fail Temperature (SAFT) of at least 100° C., and a viscosity of less than 25,000 mPa-s, such as less than 10,000 mPa-s, for example less than 5,000 mPa-s, typically less than 1,000 mPa-s at 190° C.

In other embodiments, the adhesive compositions have a Dot T-Peel adhesion of at least 8 newtons for adhesion between a fiber board and a fabric substrate at room temperature (25° C.) and a Dot T-Peel adhesion of at least 8 newtons for adhesion between two polyethylene terephthalate (PET) films at room temperature (25° C.) and at 40° C.

In order to measure set time, Dot T-Peel and substrate fiber tear, adhesive test specimens are created by bonding the substrates together with a dot of about 0.3 grams of molten adhesive and compressing the bond with a 500-gram weight. The dot size is controlled by the adhesive volume such that the compressed disk, which forms, gives a uniform circle just inside the dimensions of the substrates.

Once a construct is produced, it can be subjected to various insults to assess the effectiveness of the bond. Once a bond to a substrate fails, a simple way to quantify the effectiveness of the adhesive is to estimate the area of the adhesive dot that retained substrate fibers as the construct failed along the bond line. This estimate is called percent substrate fiber tear and the fiber tear test is executed after conditioning a sample at the test temperature for an appropriate period of time. It is preferable that an adhesive have a substrate fiber tear of approximately 80% to 100% at the conditions that the adhesive will be utilized. It is likely that 0% substrate fiber tear under these conditions would signal a loss of adhesion.

The specimens for substrate fiber tear testing are prepared using the same procedure as that described above. For low temperature fiber tear test, the bond specimens are placed in a freezer or refrigerator to obtain the desired test temperature. For substrate fiber tear at room temperature, the specimens are aged at ambient conditions. The bonds are separated by hand and a determination made as to the type of failure observed. The amount of substrate fiber tear is expressed herein as a percentage. All the fiber tear tests are conducted using Inland paper board as the substrate. Inland Paper Board is a high performance box board obtained from Inland Paper Board and Packaging Company of Rome, Ga. It is characterized as a #56 virgin high performance paper board stock.

Set time (also referred to as characteristic set time or dot set time) is defined as the time it takes for a compressed adhesive substrate construct to fasten together enough to give substrate fiber tear when pulled apart, and thus the bond is sufficiently strong to remove the compression. These set times are measured by trial and error by placing a molten dot of adhesive on to a file folder substrate taped to a flat table. Three seconds later, a file folder tab (2.5 cm×7.6 cm (1 inch by 3 inch)) is placed upon the dot and compressed with a 500-gram weight. The weight is allowed to sit for a predetermined time period from about 0.5 to about 10 seconds. The construct, thus formed, is pulled apart to check for a bonding level good enough to produce substrate fiber tear. The procedure is repeated several instances while holding the compression for different periods, and the set time is recorded as the minimum time required for this good bonding to occur. Standards are used to calibrate the process.

Dot T-Peel is determined according to ASTM D 1876, except that the specimen is produced by combining two 2.54 cm×7.62 cm (1 inch by 3 inch) substrate cut outs with a dot of adhesive with a volume that, when compressed under a 500 gram weight occupies about 6.45 cm$^2$ of area (1 square inch). Once made, all the specimens are pulled apart in side-by-side testing at a rate of 5.1 cm (2 in.) per minute by a machine (such as an Instron) that records the destructive force of the insult being applied. The maximum force achieved for each sample tested is recorded and averaged, thus producing the average maximum force, which is reported as the Dot T-Peel.

Peel Strength (modified ASTM D1876): Substrates measuring 25×76 mm (1×3 inches) are heat sealed with 130 nm (5 mil) adhesive films at 135° C. for 1 to 2 seconds and 0.28 MPa (40 psi) pressure. Bond specimens are peeled back in a tensile tester at a constant crosshead speed of 51 mm/min (2 in./min) The average force required to peel the bond (5 specimens) apart is recorded.

180° Peel Strength is determined according to ASTM D903 on stainless steel.

Rolling Ball Tack is determined according to ASTM D3121 using 6.5 cm slope.

Open time is determined according to ASTM D4497.

Shore A hardness is measured according to ASTM 2240. An air cooled dot of adhesive was subjected to the needle and the deflection was recorded from the scale.

Adhesive melt viscosity and viscosity profiles vs. temperature are measured using a Brookfield digital viscometer and a number 27 spindle according to ASTM D-3236.

SAFT (modified ASTM D 4498-00) measures the ability of a bond to withstand an elevated temperature rising at 5.5° C. (10° F.)/15 min, under a constant force that pulls the bond in the shear mode. Bonds are formed, in the manner described above, on Kraft paper (2.5 cm×7.6 cm (1 inch by 3 inch)). The test specimens are suspended vertically in an oven at room temperature with a 500-gram load attached to the bottom. The temperatures at which the weight falls is recorded (when the occasional sample reaches temperatures above the oven capacity >129° C. (265° F.) it is terminated and averaged in with the other samples at termination temperature).

Peel Adhesion Failure Temperature (PAFT) is determined using the following procedure modified according to the procedure of TAPPI T814 PM-77. Two sheets of 15.2 cm by 30.5 cm (6"×12") Kraft paper are laminated together with a 25 mm (one inch) strip of molten adhesive heated to 177° C. The laminated sheet is trimmed and cut into 25 mm (f-inch) wide strips. These strips are placed in an oven with a 100-gram of weight hanging in a peel mode. The oven temperature is increased at a rate of 30° C. per hour. The samples are hung from a switch that trips when the samples fail to record the temperature of failure.

Cloud point is determined by heating the adhesive blends to 121° C. and applying a small bead (approximately 1 gram) of the molten adhesive to the bulb of an ASTM thermometer. The temperature at which the molten adhesive clouds over is then noted. These measures of cloud point provide an indication of a hot melt's overall compatibility, i.e., the compatibility of the individual ingredients with each other.

Heat resistance (or heat stress) measures the temperature at which the adhesive starts to fail. Hot melt adhesives generally need heat resistance of 54° C. (130° F.) or above, such that sealed cases, cartons, or trays will not have heat related failure in summer time during transportation or warehouse storage. The Institute of Packaging Professionals (IOPP) heat stress test is used to measure the resistance of an adhesive to bond failure at elevated temperatures. The procedure is described in the IOPP Technical Journal, Winter 1992, pages 7-9. The IOPP test is reported as the highest temperature at which the adhesive passes or the temperature at which a majority of repeated testing passes, e.g., at least 4 passes out of 5. The inventive hot melt adhesive compositions in one embodiment have IOPP heat resistance (4 passes out of 5) of 54° C. or more, preferably 60° C. or more, more preferably 70° C. or more.

Stress-strain properties for HMA compositions were determined according to ASTM D 1708. The specimens were prepared using compression molded plaques. Tensile properties were measured on an Instron™ model 4502 equipped with a 22.48 lb. load cell and pneumatic jaws fitted with serrated grip faces. Deformation was performed at a constant crosshead speed of 5.0 in/min with a data sampling rate of 25 points/second. Initial modulus, stress and strain at yield (where evident), peak stress, tensile strength at break, and strain at break were calculated. A minimum of five specimens from each plaque was tested, the results being reported as the average value. All stresses quoted were calculated based upon the original cross-sectional area of the specimen, taking no account of reduced cross-section as a function of increasing strain. Tensile strength is defined as the maximum tensile stress. Tensile strength is also called as ultimate strength. Toughness is defined as the ability of polymer to absorb applied energy before breaking. The area under the stress-strain curve is used as a measure of the toughness.

Creep resistance is determined according to ASTM D-2293.

Density is determined according to ASTM D792 at 25° C.

The color of polymers and their blends is measured using Gardner index (Gardner color scale) according to ASTM D 1544-04. Gardner Delta 212 color comparator is used. The samples are melted at a set temperature and aged for a specified period of time prior to measurement.

The adhesives of this invention can be used in any adhesive application, including, but not limited to, disposables, packaging, laminates, pressure sensitive adhesives, tapes, labels, wood binding, paper binding, non-wovens, road marking, reflective coatings, and the like.

The adhesives described above may be applied to any substrate. Preferred substrates include wood, paper, cardboard, plastic, thermoplastic, rubber, metal, metal foil (such as aluminum foil and tin foil), metallized surfaces, cloth, non-wovens (particularly polypropylene spun bonded fibers or non-wovens), spunbonded fibers, cardboard, stone, plaster, glass (including silicon oxide ($SO_x$) coatings applied by evaporating silicon oxide onto a film surface), foam, rock, ceramics, films, polymer foams (such as polyurethane foam), substrates coated with inks, dyes, pigments, PVDC, and the like or combinations thereof.

Additional preferred substrates include polyethylene, polypropylene, polyacrylates, acrylics, polyethylene terephthalate, or any of the polymers listed above as suitable for blends. Any of the above substrates, and/or the polymers of this invention, may be corona discharge treated, flame treated, electron beam irradiated, gamma irradiated, microwaved, or silanized.

In a particular embodiment, the adhesives of this invention can be used in a packaging article. The packaging article may be useful as a carton, container, crate, case, corrugated case, or tray, for example. More particularly, the packaging article may be useful as a cereal product, cracker product, beer packaging, frozen food product, paper bag, drinking cup, milk carton, juice carton, drinking cup, or as a container for shipping produce, just to name a few exemplary uses.

The packaging article is formed by applying an adhesive composition to at least a portion of one or more packaging elements. The packaging elements may be formed from paper, paperboard, containerboard, tagboard, corrugated board, chipboard, kraft, cardboard, fiberboard, plastic resin, metal, metal alloys, foil, film, plastic film, laminates, sheeting, or any combinations thereof. In one aspect, the adhesive composition may be used to bind or bond two or more packaging elements together, wherein the packaging elements are formed from the same or different type of materials. Accordingly, the packaging elements may be individually formed from paper, paperboard, containerboard, tagboard, corrugated board, chipboard, kraft, cardboard, fiberboard, plastic resin, metal, metal alloys, foil, film, plastic film, laminates, sheeting, or any combination thereof. The one or more packaging elements may also be individually coated using paper, foil, metal, metal alloys, polyethylene, polypropylene, polyester, polyethylene terephthalate, polyvinyl chloride, polyvinylidine chloride, polyvinyl acetate, polyamides, homopolymers thereof, and combinations and copolymers thereof.

The adhesive composition may also be formulated in an embodiment to have a viscosity of less than 1000 mPa-s at 190° C.; a tensile strength of at least 2 MPa (300 psi), preferably at least 3.4 MPa (500 psi), more preferably at least 4.8 MPa (700 psi); and an elongation of at least 30%, preferably at least 80%, more preferably at least 120%.

The adhesive composition may also be formulated in an embodiment to have fiber tear of greater than 80% at room temperature, have fiber tear of greater than 80% at −18° C., and/or have fiber tear of greater than 80% at 20° C. The adhesive composition is also formulated in an embodiment to have a set time of less than 3 seconds, or less than 2 seconds, preferably from 1 to 2 seconds.

The formulated adhesive composition in an embodiment may also has a PAFT of at least 60° C., preferably at least of 80° C.; a SAFT of at least 70° C., preferably at least of 100° C.; and/or a cloud point of 275° C. or less, preferably 130° C. or less.

The adhesive composition is also preferably formulated in one embodiment to has a viscosity of less than 25,000 mPa-s at 190° C.; has tensile strength of at least 6.89 MPa (1000 psi), preferably at least 10.34 MPa (1500 psi), more preferably at least 13.79 MPa (2000 psi); and has an elongation of at least 200%, preferably at least 400%, more preferably at least 600%.

In yet another aspect, the adhesive composition has an open time of 3 seconds or more. Preferably, the adhesive composition has an open time of 20 seconds or more. More preferably, the adhesive composition has an open time of 60 seconds or more. In another aspect, the adhesive composition has a set time of 5 minute or less, preferably 3 minutes or less, more preferably 2 minutes or less.

Accordingly, the present invention also provides the following embodiments:

A. A composition comprising: a base polymer having a peak melting point greater than 50° C.; an ester copolymer comprising an olefin and a copolymerizable ester and wherein the ester copolymer has a pour point less than 40° C.

B. The composition of embodiment A, wherein the base polymer comprises a first olefin and a first copolymerizable ester wherein the base polymer has a peak melting point greater than 50° C.; and wherein the ester copolymer comprises a second olefin and a second copolymerizable ester, wherein the first and second olefins can be the same or different, wherein the first and second copolymerizable esters can be the same or different, and wherein the ester copolymer has a pour point less than 40° C.

C. The composition of embodiment A or embodiment B, wherein the viscosity at 177° C. of the composition is less than 95% of the viscosity without incorporating the ester copolymer.

D. The composition of any one of the preceding embodiments, further comprising a tackifier and a wax.

E. The composition of any one of the preceding embodiments, wherein the composition comprises from 1 wt % to 80 wt % of the base polymer, from 1 wt % to 70 wt % of a tackifier, and from 1 wt % to 15 wt % of a wax, based on the total weight of the composition.

F. The composition of embodiment E, wherein the viscosity at 177° C. of the composition is less than 95% of the viscosity of a blend of the base polymer, the tackifier, and the wax.

G. The composition of embodiment E or embodiment F, wherein the fiber tear of the composition at 25° C. using Inland paper board as a substrate is at least 95% of the fiber tear of a blend of the base polymer, the tackifier, and the wax.

H. The composition of any one of the preceding embodiments, wherein the composition has at least 95% fiber tear at 25° C. using Inland paper board as a substrate.

I. The composition of any one of the preceding embodiments, wherein the ester copolymer is present at from 1% to 25% by weight of the base polymer.

J. The composition of any one of the preceding embodiments, wherein the olefin comprises ethylene.

K. The composition of any one of the preceding embodiments, wherein the copolymerizable ester is selected from the group consisting of vinyl esters of carboxylic acids, alkyl esters of acrylic, and methacrylic acids, and combinations thereof.

L. The composition of any one of the preceding embodiments, wherein the base polymer comprises a melt index from 10 to 1000 g/10 minutes.
M. The composition of any one of the preceding embodiments, wherein the base polymer is selected from ethylene-vinyl acetate and ethylene-n-butyl acrylate.
N. The composition of any one of the preceding embodiments, wherein the ester copolymer comprises ethylene-vinyl acetate.
O. The composition of any one of the preceding embodiments, wherein the ester copolymer comprises a pour point below 25° C.
P. The composition of any one of the preceding embodiments, wherein the ester copolymer comprises a viscosity at 25° C. from 50 to 300 mPa-s.
Q. The composition of any one of the preceding embodiments, wherein the ester copolymer is at least 95% by weight non-crystalline.
R. The composition of any one of the preceding embodiments, wherein the base polymer comprises from 15% to 45% by weight of a copolymerizable ester.
S. The composition of any one of the preceding embodiments, wherein the ester copolymer comprises from 10% to 60% by weight of a copolymerizable ester.
T. The composition of any one of the preceding embodiments, further comprising an antioxidant, colorizer, dye, or filler.
U. The composition of any one of the preceding embodiments, wherein the composition is an adhesive composition, comprising: from 1 wt % to 80 wt % of the base polymer selected from ethylene-vinyl acetate and ethylene-n-butyl acrylate, from 1 wt % to 60 wt % of a tackifier, and from 1 wt % to 15 wt % of a wax, by total weight of the base polymer, the tackifier, and the wax; and from 1 wt % to 25 wt % of the ester copolymer by weight of the base polymer, wherein the ester copolymer comprises a liquid ethylene-vinyl acetate copolymer; and wherein the base polymer is solid at 25° C. and has a melt index greater than 10 g/10 minutes, wherein the viscosity at 177° C. of the adhesive composition is less than 80% of the viscosity of a blend of the base polymer, tackifier, and wax, and wherein the adhesive composition has at least 95% fiber tear at 25° C. using Inland paper board as a substrate.
V. The composition of any one of the preceding embodiments, wherein the composition has a viscosity at 177° C. of from about 500 to about 2000 mPa-s, or from about 700 to about 1100 mPa-s.
W. The composition of any one of the preceding embodiments, wherein the base polymer has a weight average molecular weight greater than 10,000.
X. A method of reducing the melt viscosity of a hot melt adhesive comprising a mixture of an adhesive base polymer, a tackifier, and a wax; the method comprising the step of incorporating a liquid ethylene-copolymerizable ester copolymer into the mixture in an amount from 1% to 25% by weight of the adhesive copolymer.
Y. The method of embodiment W, wherein incorporation of the liquid copolymer reduces the viscosity of the hot melt adhesive at 177° C. by at least 20% relative to the hot melt adhesive without the liquid copolymer, and wherein the hot melt adhesive incorporating the liquid copolymer has a fiber tear of at least 95% at 25° C. using Inland paper board as a substrate.
Z. The method of embodiment W or X, further comprising applying the hot melt adhesive to a substrate at a temperature of less than 150° C.
AA. The method of embodiment W, X, or Y, wherein the melt viscosity of the hot melt adhesive at 177° C. is reduced to from about 500 to about 2000 mPa-s, or to from about 700 to about 1100 mPa-s.
BB. The adhesive composition of embodiment Z wherein the adhesive composition has a viscosity of less than 1500 MPa-s at 177° C.

The invention will now be more particularly described with reference to the following non-limiting Examples.

Peak melting point, Tm, (also referred to as melting point), peak crystallization temperature, Tc, (also referred to as crystallization temperature), glass transition temperature (Tg), heat of fusion ($\Delta Hf$ or Hf), and percent crystallinity were determined using the following differential scanning calorimetric (DSC) procedure according to ASTM D3418-03. DSC data were obtained using a TA Instruments model Q100 machine. Samples weighing approximately 5-10 mg were sealed in an aluminum hermetic sample pan. The DSC data were recorded by first gradually heating the sample to 200° C. at a rate of 10° C./minute. The sample was kept at 200° C. for 2 minutes, and then cooled to −90° C. at a rate of 10° C./minute, followed by an isothermal for 2 minutes and heating to 200° C. at 10° C./minute. Both the first and second cycle thermal events were recorded. Areas under the endothermic peaks were measured and used to determine the heat of fusion and the percent of crystallinity. The percent crystallinity is calculated using the formula, [area under the melting peak (Joules/gram)/B(Joules/gram)]*100, where B is the heat of fusion for the 100% crystalline homopolymer of the major monomer component. These values for B are to be obtained from the Polymer Handbook, Fourth Edition, published by John Wiley and Sons, New York 1999, provided; however, that a value of 189 J/g (B) is used as the heat of fusion for 100% crystalline polypropylene, a value of 290 J/g is used for the heat of fusion for 100% crystalline polyethylene. The Tm, and Tg reported here were measured and reported during the second heating cycle (second melt) unless otherwise noted. The heat of fusion and Tc were measured and reported during the first cooling cycle (first crystallization) unless otherwise noted.

For polymers displaying multiple endothermic and exothermic peaks, all the peak crystallization temperatures and peak melting temperatures were reported. The heat of fusion for each endothermic peak was calculated individually. The percent crystallinity is calculated using the sum of heat of fusions from all endothermic peaks. Some of polymer blends produced show a secondary melting/cooling peak overlapping with the principal peak, which peaks are considered together as a single melting/cooling peak. The highest of these peaks is considered the peak melting temperature/crystallization point. Prior to the DSC measurement, the sample was aged (typically by holding it at ambient temperature for a period of 2 days) or annealed to maximize the level of crystallinity.

A Tack Test Procedure was used to evaluate some adhesives in the following examples. In this procedure, a 25.4 micron (1 mil) thick layer of molten adhesive is applied to paper, a second piece of paper is placed on top, a 454 g (1 lb) weight applied, and the bond allowed to cool. The top piece of paper was then lifted into the air, and if the bottom piece is held separation from the top sheet was tried. The score on a scale of 1 to 10 is as follows:
  10=Full fiber tear adhesion—the samples will not separate without tearing the paper.
  5=Difficult to separate, masking tape applied to stainless steel, for example 1=The two pieces of paper adhere sufficiently that upon lifting one piece in the air the other will stay attached for more than 10 seconds, i.e., the bond strength is sufficient to support the weight of the paper.

0=No sticky tack force at all—upon lifting the top piece the top and bottom pieces immediately separate.

In the tack test procedure a score of 1 or more indicates utility as an adhesive, e.g., for temporarily holding together two small pieces, two sheets of paper or a sheet of paper and a piece of plastic sheet.

EXAMPLES

EnBA and EVA resins were formulated into hot melt adhesives. The resins listed in Table 1 were formulated with an adhesive ethylene-vinyl acetate copolymer (EVA) or an adhesive ethylene n-butyl acrylate copolymer, tackifier, wax, and an antioxidant, with or without a liquid EVA. The blending was carried out at low shear mixing at elevated temperature of about 177° C. EXXONMOBIL EnBA EN 33330 EnBA and EXXONMOBIL EnBA EN 33900 EnBA are ethylene-n-butyl acrylate copolymers containing 32.5 wt % n-butyl acrylate and having melt indices of 330 and 900 g/10 minutes, respectively. EN 33330 EnBA and EN 33900 EnBA also have viscosities at 150° C. of 76,800 mPa-s and 21,800 mea-s, respectively. ESCORENE ULTRA MV 02514 EVA is an ethylene-vinyl acetate having a melt viscosity at 190° C. of 3100 mPa-s and a viscosity at 150° C. of 7560 mPa-s. EVA Liquid 1 is a liquid EVA having a viscosity at 25° C. of 170 mPa-s and at 150° C. of 88.6 mPa-s, containing 36.5 wt % vinyl acetate and 250 ppm IRGANOX 1076 octadecyl 3,5-di-(tert)-butyl-4-hydroxyhydrocinnamate. ESCOREZ 5600 tackifier is an aromatic-modified, cycloaliphatic hydrocarbon resin having a softening point of 103° C. PARAFLINT H1 F-T Wax is a Fischer-Tropsch wax from Moore and Munger Inc. IRGANOX 1010 is a phenolic antioxidant available from Ciba-Geigy.

HMA4 vs. HMA3) to less than 30% without the liquid EVA (see HMA6 vs. HMAS). Examples HMA1 to HMA6 demonstrate that well balanced adhesive performance was achieved through the combination of adhesive polymer components and low pour point EVA components, including EVA liquid.

Figure 2:
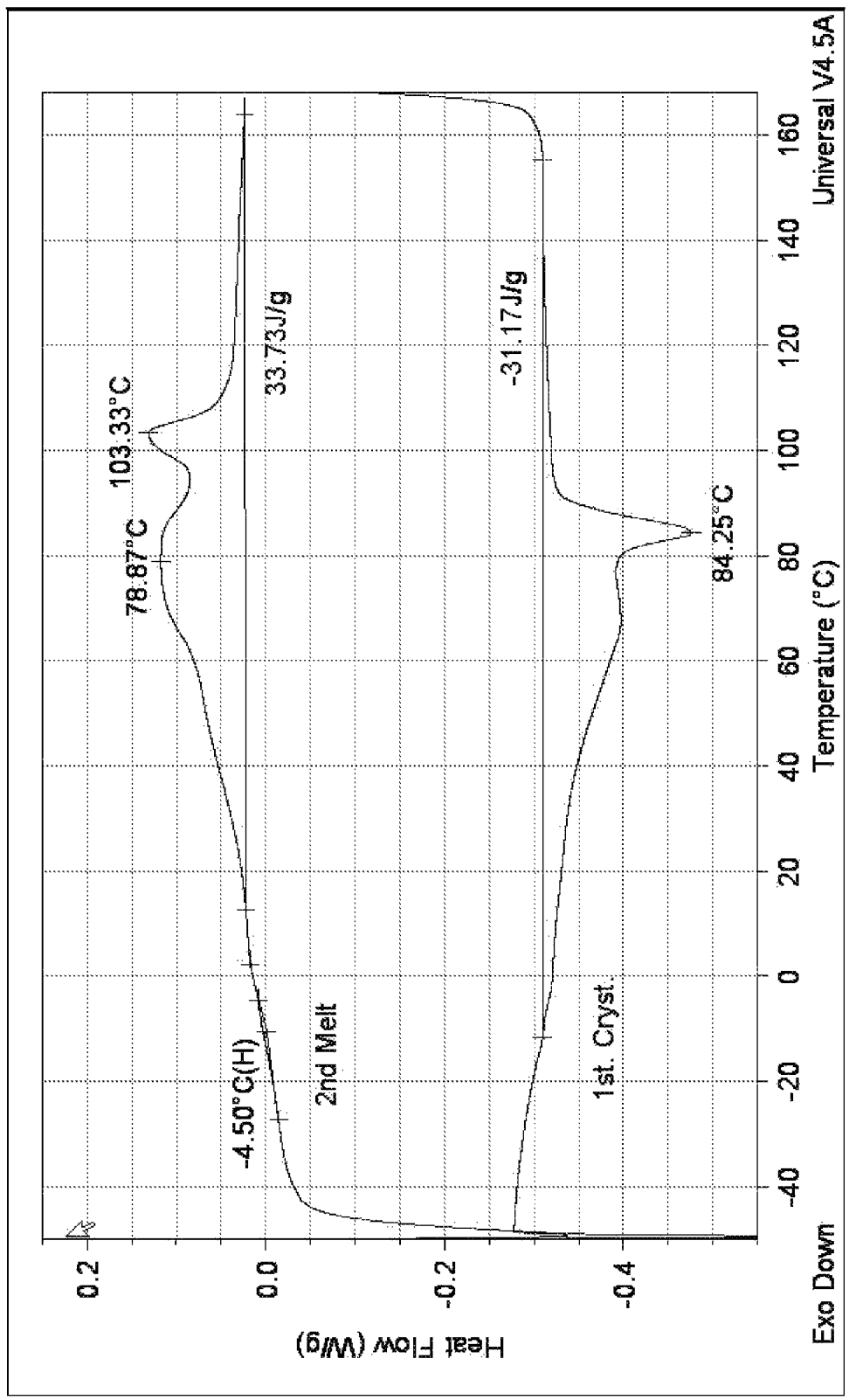
FIG. 2 shows a similar adhesive composition in which 5 wt % of a liquid EVA copolymer is present as described in example HMA2 in Table 1, illustrating that the peak melting temperature of HMA2 is unchanged (within experimental confidence interval) as compared to HMA1 represented in FIG. 1.

The adhesive formulations HMA1 (FIG. 1) and HMA2 (FIG. 2) listed in Table 1 were subjected to DSC thermal analysis. HMA1 and HMA2 had peak melting temperatures that were changed very little, viz., less than 0.6° C., despite the presence of 5% EVA Liquid 1 in HMA2.

The adhesive formulations listed in Table 2 were subjected to DSC thermal analysis. EVA Liquid 2 is a liquid EVA having a viscosity at 25° C. of 110 mPa-s and at 150° C. of 54.4 mPa-s, containing 36.5 wt % vinyl acetate and 250 ppm IRGANOX 1076 octadecyl 3,5-di-(tert)-butyl-4-hydroxyhydrocinnamate.

TABLE 2

| DSC Testing Formulations | | |
|---|---|---|
| Hot Melt Adhesive | HMA8 | HMA7 |
| Formulation, wt % | | |
| MV 02514 EVA | 34 | 17 |
| EVA Liquid 2 | | 17 |
| ESCOREZ 5600 Tackifier | 40 | 40 |
| PARAFLINT H1 F-T Wax | 25 | 25 |
| IRGANOX 1010 (wt %) | 1 | 1 |
| Properties | | |
| Tm, ° C. | 82.3 | 82.8 |
| Tc, ° C. | 90.11 | 91.33 |
| Tg , ° C. | −16.91 | −17.11 |
| Delta Heat of Fusion, J/g | −84.19 | −73.45 |
| Viscosity, 177° C. (mPa-s) | 230 | 68 |
| Viscosity, 150° C. (mPa-s) | 440 | 130 |
| Viscosity, 130° C. (mPa-s) | 760 | 230 |

TABLE 1

| Hot Melt Adhesive Examples | | | | | | |
|---|---|---|---|---|---|---|
| | Hot Melt Adhesive | | | | | |
| | HMA1 | HMA2 | HMA3 | HMA4 | HMA5 | HMA6 |
| Formulation, wt % | | | | | | |
| EN 33330 EnBA | 45% | 40% | | | | |
| EN 33900 EnBA | | | 59% | 54% | | |
| MV 02514 EVA | | | | | 55% | 45% |
| EVA Liquid 1 | 0 | 5% | 0 | 5% | 0 | 10% |
| ESCOREZ 5600 Tackifier | 44% | 44% | 30% | 30% | 34% | 34% |
| PARAFLINT H1 F-T Wax | 10% | 10% | 10% | 10% | 10% | 10% |
| IRGANOX 1010 (wt %) | 1% | 1% | 1% | 1% | 1% | 1% |
| Properties | | | | | | |
| Tm | 78.7 | 78.9 | | | | |
| Tc | 87.3 | 84.3 | | | | |
| Tg | −14.0 | −4.5 | | | | |
| Heat of Fusion J/g | 37.6 | 31.2 | | | | |
| Viscosity, 177° C. (mPa-s) | 2265 | 1672 | 2150 | 1675 | 5925 | 1335 |
| Fiber tear, room temperature (Inland) | 99 | 99 | 99 | 100 | 99 | 100 |
| Fiber tear, room temperature (84 C. paper) | 100 | 100 | 100 | 100 | 100 | 100 |

The formulated adhesives with EVA liquid have good fiber tear that is the same as or slightly better than the adhesives formulated with additional base EVA/ENBA polymer without any EVA liquid, but have a much lower viscosity at 177° C. which ranges from less than 80% of the viscosity of the similar adhesive formulation without the EVA liquid (see

TABLE 2-continued

DSC Testing Formulations

| Hot Melt Adhesive | HMA8 | HMA7 |
|---|---|---|
| Viscosity, 110° C. (mPa-s) | 1600 | 460 |
| Viscosity, 90° C. (mPa-s) | 181,000 | 12,000 |
| Tack Test Score | 10 | 1 |

Figure 3:
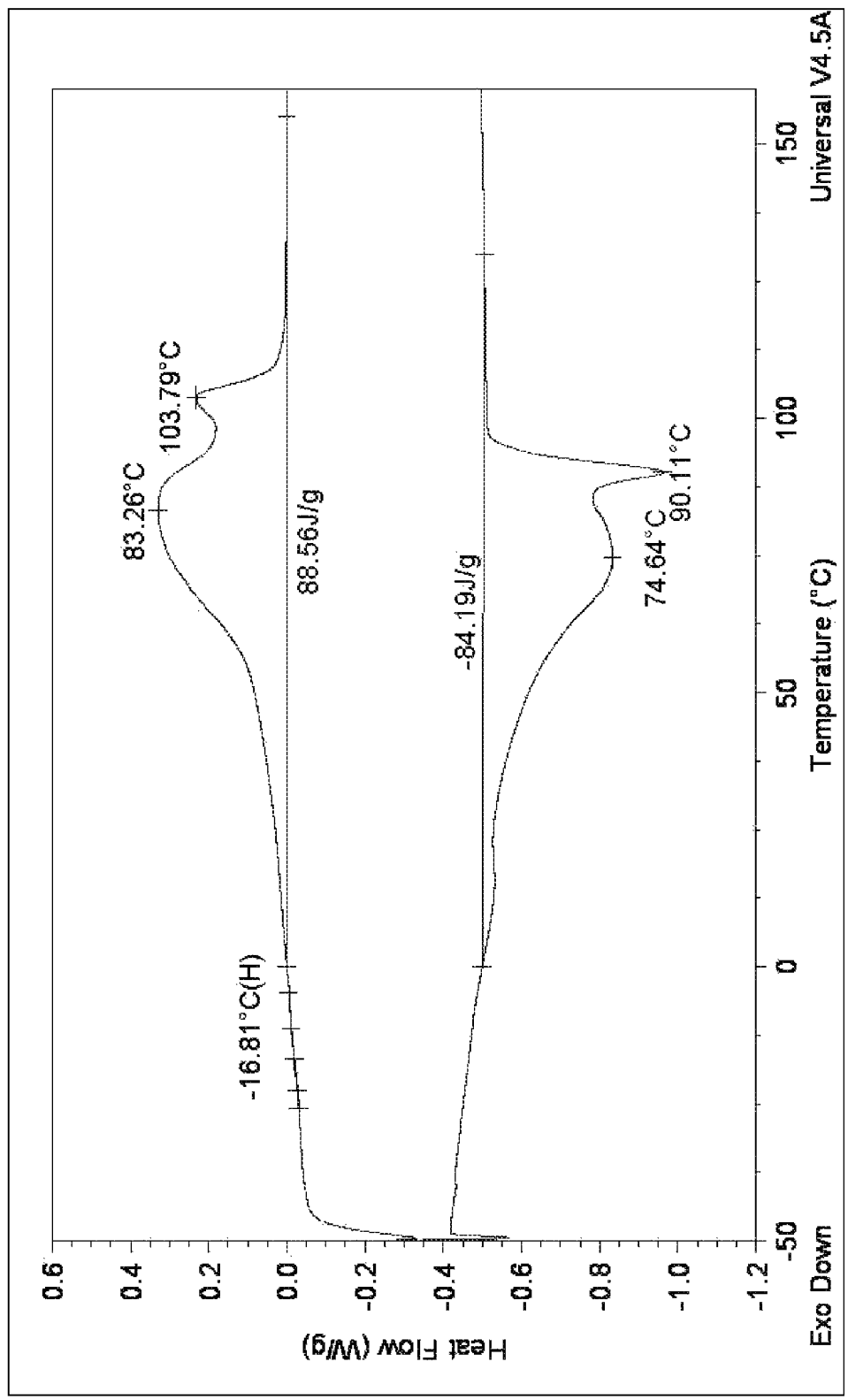
FIG. 3 shows DSC curves for example HMA8, as described in Table 2.
Figure 4:
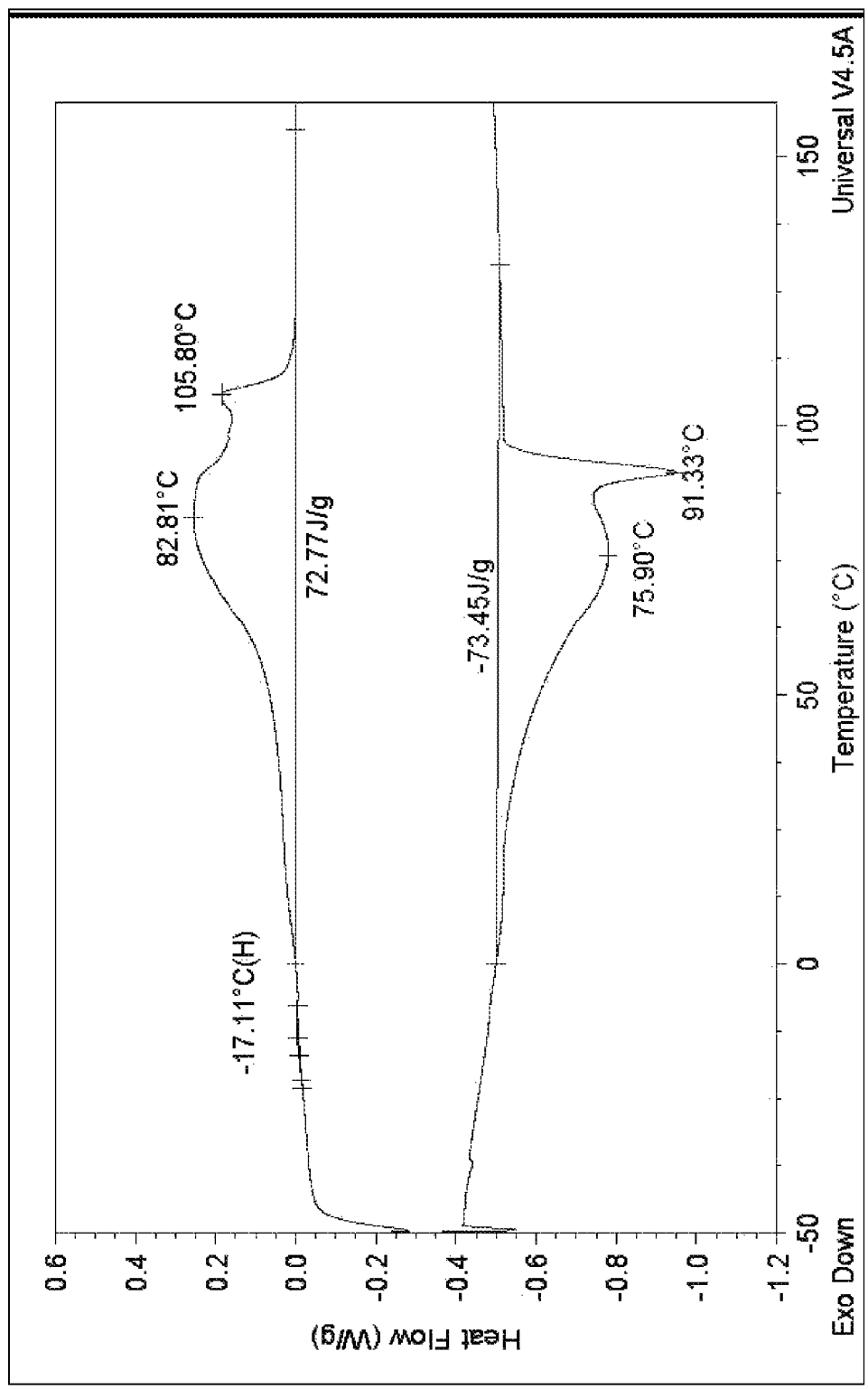
FIG. 4 shows DSC curves for example HMA7, as described in Table 2.

The DSC curves for the HMA8 (FIG. 3) and HMA7 (FIG. 4) show that Tm, Tc, and Tg temperatures and glass transition temperatures were similar in both the HMA8 without the liquid EVA and HMA7 with the liquid EVA at 17 wt %, i.e., no more than about 2° C. apart, indicating that the EVA liquid has minimal impact on the strength of the adhesive EVA resin below the Tm. The heat of fusion is less for the liquid-filled system, which equates to less energy required to melt the HMA with the liquid EVA. The liquid-filled system also demonstrates that the highly liquid filled system has some adhesive utility.

Styrenic block copolymers were formulated into pressure sensitive adhesives. The styrenic block copolymers listed in Table 3 were formulated with a tackifier, and an antioxidant, with or without a liquid EVA. The blending was carried out at low shear mixing at elevated temperature of about 177° C. VECTOR 4113 is a styrenic block copolymer manufactured by Dexco Polymers, L.P. comprising a styrene-isoprene-styrene triblock and styrene-isoprene diblock blend and having a styrene content of 15 wt %, melt flow rate of 10 dg/min (ASTM D 1238, 200° C., 5 kg), solution viscosity of 1200 cps using 25 wt % toluene at 25° C. (ASTM D 2196), and density of 0.92 g/cc (ASTM D792). VECTOR 8508 is a styrenic block copolymer manufactured by Dexco Polymers, L.P. comprising a styrene-butadiene-styrene triblock copolymer and having a styrene content of 29 wt %, melt flow rate of 12 dg/min (ASTM D 1238, 200° C., 5 kg), solution viscosity of 400 cps using 25 wt % toluene at 25° C. (ASTM D 2196), and density of 0.94 g/cc (ASTM D792). EVA Liquid 3 is a liquid EVA having a viscosity at 25° C. of 170 mPa-s and at 150° C. of 88.6 mPa-s, containing 36.5 wt % vinyl acetate and 250 ppm IRGANOX 1076 [octadecyl 3,5-di-(tert)-butyl-4-hydroxyhydrocinnamate]. ESCOREZ 2203 tackifier is an aromatic-modified aliphatic hydrocarbon resin having a softening point of 93° C. ESCOREZ 5600 tackifier is an aromatic-modified, cycloaliphatic hydrocarbon resin having a softening point of 103° C. IRGANOX 1010 is a phenolic antioxidant available from Ciba-Geigy. TUFFLO 6056 is a white mineral oil manufactured by Citgo having a viscosity (CST) @40° C. of 104.05 (ASTM D445).

TABLE 3

| | Adhesive | | | | | | | | |
|---|---|---|---|---|---|---|---|---|---|
| | A1 | A2 | A3 | A4 | A5 | A6 | A7 | A8 | A9 |
| Formulation, wt % | | | | | | | | | |
| VECTOR 4113 | 43.3 | 43.3 | 43.3 | 43.3 | 30.3 | 30.3 | | | 24 |
| VECTOR 8508 | | | | | 13 | 13 | 43.3 | 43.3 | |
| ESCOREZ 2203 | 51.9 | 51.9 | | | 51.9 | 51.9 | | | 29 |
| ESCOREZ 5600 | | | 51.9 | 51.9 | | | 51.9 | 51.9 | |
| IRGANOX 1010 | 0.3 | 0.3 | 0.3 | 0.3 | 0.3 | 0.3 | 0.3 | 0.3 | 0 |
| TUFFLO 1010 | 4.5 | | 4.5 | | 4.5 | | 4.5 | | |
| EVA Liquid 3 | | 4.5 | | 4.5 | | 4.5 | | 4.5 | 46 |
| Properties | | | | | | | | | |
| Viscosity @ 190° C. (centipoise) | 39,100 | 48,180 | 48,500 | 53,330 | 33,400 | 33,040 | 31,160 | 36,550 | 803 |
| Rolling Ball Tack (cm of ball travel) | 8.7 | 13.5 | 10.9 | 16.3 | 23.8 | 29.6 | 16.6 | 16.6 | 4.1 |
| 180° Peel Strength (lb · in) | 3.905 | 3.351 | 4.339 | 2.505 | 4.358 | 1.815 | 3.585 | 2.993 | 0.095 |
| Failure Mode | AF | CF | AF | CF | AF | CF | AF | CF | CF |

(CF = cohesive failure)
(AF = adhesive failure)

The formulated adhesives in Table 3 with Liquid EVA 3 showed cohesive failure which is desirable for tamper evident packaging.

The preceding description has been presented with reference to presently preferred embodiments of the invention. Persons skilled in the art and technology, to which this invention pertains, will appreciate that alterations and changes in the described compositions and methods can be practiced without meaningfully departing from the principle and scope of this invention. Accordingly, the foregoing description should not be read as pertaining only to the exact embodiments described and shown in the accompanying drawings, but rather should be read as consistent with and as support for the following claims, which are to have their fullest and fairest scope.

All documents described herein are incorporated by reference herein, including any priority documents and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law.

What we claim is:

1. A composition comprising:
   a base polymer, wherein the base polymer comprises a first olefin and wherein the first olefin comprises ethylene; and
   from about 1 wt % to about 25 wt % of an ester copolymer by weight of the composition,
      wherein the ester copolymer comprises an olefin and a copolymerizable ester,
      wherein the ester copolymer has a pour point less than 40° C.;
   and wherein the base polymer is different than the ester copolymer;
   wherein the composition is used for a tamper evident packaging article.

2. The composition of claim 1, wherein the base polymer is a solid at 50° C.

3. The composition of claim 1, wherein the base polymer has a peak melting point greater than 50° C.

4. The composition of claim 1, wherein the base polymer has a melt index from 0.1 g/10 minutes to 3,000 g/10 min.

5. The composition of claim 1, wherein the base polymer has a melt index from 0.1 g/10 minutes to 2,000 g/10 min.

6. The composition of claim 1, wherein the base polymer has a melt index from 0.1 g/10 minutes to 1,000 g/10 min.

7. The composition of claim 1, wherein the base polymer further comprises a first copolymerizable ester wherein the base polymer has a peak melting point greater than 50° C.; and wherein the ester copolymer comprises a second olefin and a second copolymerizable ester, wherein the first and second olefins can be the same or different, wherein the first and second copolymerizable esters can be the same or different, and wherein the ester copolymer has a pour point less than 40° C.

8. The composition of claim 7, wherein the viscosity at 177° C. of the composition is less than 95% of the viscosity of the base polymer without incorporating the ester copolymer.

9. The composition of claim 7, further comprising a tackifier and a wax.

10. The composition of claim 9, wherein the composition comprises from 1 wt % to 80 wt % of the base polymer, from 1 wt % to 70 wt % of the tackifier and from 1 wt % to 15 wt % of the wax, based on the total weight of the composition.

11. The composition of claim 9, wherein the viscosity at 177° C. of the composition is less than 95% of the viscosity of a blend of the base polymer, the tackifier, and the wax.

12. The composition of claim 9, wherein the fiber tear of the composition at 25° C. using Inland paper board as a substrate is at least 95% of the fiber tear of a blend of the base polymer, the tackifier, and the wax.

13. The composition of claim 9, wherein the composition has at least 95% fiber tear at 25° C. using Inland paper board as a substrate.

14. The composition of claim 7, wherein the second olefin comprises ethylene.

15. The composition of claim 7, wherein the first and second copolymerizable esters can be the same or different and are selected from the group consisting of vinyl esters of carboxylic acids, alkyl esters of acrylic and methacrylic acids, and combinations thereof.

16. The composition of claim 1, wherein the base polymer is selected from ethylene-vinyl acetate and ethylene-n-butyl acrylate.

17. The composition of claim 7, wherein the ester copolymer comprises ethylene-vinyl acetate.

18. The composition of claim 7, wherein the ester copolymer comprises a pour point below 25° C.

19. The composition of claim 7, wherein the ester copolymer comprises a viscosity at 25° C. from 50 to 300 mPa-s.

20. The composition of claim 7, wherein the ester copolymer is at least 95% by weight non-crystalline.

21. The composition of claim 7, wherein the base polymer comprises from 15% to 45% by weight of the first copolymerizable ester.

22. The composition of claim 7, wherein the ester copolymer comprises from 10% to 60% by weight of the second copolymerizable ester.

23. The composition of claim 16, wherein the base polymer comprises more than 50 wt % ethylene vinyl acetate copolymer wherein the ethylene vinyl acetate copolymer has a vinyl acetate content of greater than 10% and wherein the adhesive composition has a viscosity of less than 3000 MPa-s at 177° C.

24. An adhesive composition, comprising:
   from 1 wt % to 80 wt % of a base polymer selected from ethylene-vinyl acetate and ethylene-n-butyl acrylate, from 1 wt % to 60 wt % of a tackifier and from 1 wt % to 15 wt % of a wax, by total weight of the base polymer, the tackifier, and the wax wherein the base polymer is solid at 25° C. and has a melt index greater than 10 g/10 minutes;
   from 1 wt % to 25 wt % of a liquid ethylene-vinyl acetate copolymer by weight of the adhesive composition; and
   wherein the viscosity at 177° C. of the adhesive composition is less than 80% of the viscosity of a blend of the base polymer, tackifier, and wax, and wherein the adhesive composition has at least 95% fiber tear at 25° C. using Inland paper board as a substrate;
   and wherein the base polymer is different than the ethylene-vinyl acetate copolymer;
   wherein the adhesive composition is used for a tamper evident packaging article.

* * * * *